US011809775B2

(12) United States Patent
Sabin et al.

(10) Patent No.: US 11,809,775 B2
(45) Date of Patent: Nov. 7, 2023

(54) CONVERSATION ASSISTANCE AUDIO DEVICE PERSONALIZATION

(71) Applicant: Bose Corporation, Framingham, MA (US)

(72) Inventors: Andrew Todd Sabin, Chicago, IL (US); Jahn Dmitri Eichfeld, Natick, MA (US); Benjamin Davis Parker, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 367 days.

(21) Appl. No.: 17/014,409

(22) Filed: Sep. 8, 2020

(65) Prior Publication Data

US 2020/0401369 A1    Dec. 24, 2020

Related U.S. Application Data

(62) Division of application No. 16/165,055, filed on Oct. 19, 2018, now Pat. No. 10,795,638.

(51) Int. Cl.
*G06F 3/16* (2006.01)
*H04B 17/309* (2015.01)
(Continued)

(52) U.S. Cl.
CPC .............. *G06F 3/165* (2013.01); *G06F 3/167* (2013.01); *H04B 17/309* (2015.01); *H04R 1/406* (2013.01);
(Continued)

(58) Field of Classification Search
CPC .......... G06F 3/165; G06F 3/167; G06F 3/162; H04B 17/309; H04R 1/406; H04R 3/005; H04R 3/04; H04R 2430/01
See application file for complete search history.

(56) References Cited

U.S. PATENT DOCUMENTS

| 5,636,285 A | * | 6/1997 | Sauer | H04R 25/70 381/314 |
| 5,759,658 A | | 6/1998 | Piekos | A47B 13/08 428/111 |

(Continued)

FOREIGN PATENT DOCUMENTS

| EP | 2063663 A1 * | 5/2009 | ............. H04R 25/70 |
| EP | 3236673 A1 | 10/2017 | |

OTHER PUBLICATIONS

Littmann et al., "SpeechFocus: 360 degree in 10 Questions," Tech Topic, Nov. 2015 Hearing Review, 7 pages.
(Continued)

*Primary Examiner* — Carolyn R Edwards
*Assistant Examiner* — Kuassi A Ganmavo
(74) *Attorney, Agent, or Firm* — Hoffman Warnick LLC

(57) ABSTRACT

Various implementations include conversation assistance audio devices with settings that are adjustable based upon user feedback. In some cases, a computer-implemented method of personalizing a conversation assistance audio device includes: receiving a command from a user for assistance with audio settings in the conversation assistance audio device; applying a baseline set of audio settings to the conversation assistance audio device in response to receiving the user command for assistance; receiving a user command to change the baseline set of audio settings; and applying a modified set of audio settings to the conversation assistance audio device in response to receiving the user command to change the baseline set of audio settings, wherein the modified set of audio settings are applied based upon usage of the conversation assistance audio device and a population model of usage of similar conversation assistance audio devices.

13 Claims, 7 Drawing Sheets

(51) Int. Cl.
*H04R 1/40* (2006.01)
*H04R 3/00* (2006.01)
*H04R 3/04* (2006.01)

(52) U.S. Cl.
CPC .............. *H04R 3/005* (2013.01); *H04R 3/04* (2013.01); *H04R 2430/01* (2013.01)

(56) References Cited

U.S. PATENT DOCUMENTS

| | | | |
|---|---|---|---|
| 6,118,877 A | 9/2000 | Lindemann | H04R 25/70 381/60 |
| 6,148,274 A * | 11/2000 | Watanabe | G06F 30/327 381/60 |
| 7,245,731 B2 | 7/2007 | Niederdrank et al. | |
| 7,340,062 B2 | 3/2008 | Revit | H04R 25/70 381/17 |
| 9,131,321 B2 | 9/2015 | Sabin | |
| 9,560,451 B2 | 1/2017 | Eichfeld et al. | |
| 2005/0105750 A1 | 5/2005 | Frohlich | H04R 25/507 381/314 |
| 2005/0114127 A1 | 5/2005 | Rankovic | G10L 21/0364 704/233 |
| 2006/0177079 A1* | 8/2006 | Baekgaard Jensen | H04R 25/407 381/312 |
| 2006/0239472 A1* | 10/2006 | Oda | H03G 5/165 704/E21.009 |
| 2008/0144869 A1 | 6/2008 | Paludan-Mueller | H04R 25/356 381/320 |
| 2008/0165978 A1 | 7/2008 | Cronin | A61B 5/121 381/58 |
| 2009/0074215 A1* | 3/2009 | Schumaier | H04R 25/75 381/314 |
| 2010/0054510 A1* | 3/2010 | Schumaier | H04R 25/75 381/314 |
| 2010/0086156 A1 | 4/2010 | Rank et al. | |
| 2010/0121634 A1 | 5/2010 | Muesch | G10L 21/0205 704/224 |
| 2010/0202637 A1* | 8/2010 | Cornelisse | H04R 25/70 381/314 |
| 2010/0257128 A1* | 10/2010 | De Vries | G06N 20/00 703/2 |
| 2010/0329490 A1 | 12/2010 | Van Schijndel | H04R 25/70 381/314 |
| 2011/0219879 A1 | 9/2011 | Chalupper | A61B 5/12 73/585 |
| 2012/0128187 A1 | 5/2012 | Yamada et al. | |
| 2012/0182429 A1 | 7/2012 | Forutanpour et al. | |
| 2012/0237064 A1* | 9/2012 | Garratt | H04R 25/70 381/314 |
| 2013/0148829 A1 | 6/2013 | Lugger | |
| 2013/0195298 A1 | 8/2013 | Sacha | |
| 2013/0202123 A1* | 8/2013 | Nishizaki | H04R 25/70 381/60 |
| 2013/0329923 A1 | 12/2013 | Bouse | |
| 2014/0146986 A1* | 5/2014 | Ypma | H04R 25/505 381/314 |
| 2014/0198934 A1 | 7/2014 | Recker | |
| 2014/0275730 A1* | 9/2014 | Lievens | H04R 25/606 600/25 |
| 2014/0294183 A1 | 10/2014 | Lee et al. | |
| 2014/0355798 A1* | 12/2014 | Sabin | H04R 25/50 381/314 |
| 2014/0378083 A1 | 12/2014 | Kannappan et al. | |
| 2015/0023512 A1 | 1/2015 | Shennib | |
| 2015/0023534 A1 | 1/2015 | Shennib | |
| 2015/0049892 A1 | 2/2015 | Petersen et al. | |
| 2015/0172831 A1* | 6/2015 | Dittberner | H04R 25/70 381/314 |
| 2015/0230036 A1 | 8/2015 | Pedersen et al. | |
| 2015/0271607 A1* | 9/2015 | Sabin | H04R 25/70 381/314 |
| 2015/0289064 A1 | 10/2015 | Jensen et al. | |
| 2016/0234609 A1 | 8/2016 | Bendsen | |
| 2017/0013370 A1* | 1/2017 | Baeuml | H04R 25/55 |
| 2017/0055090 A1* | 2/2017 | Gran | H04R 25/407 |
| 2019/0028817 A1 | 1/2019 | Gabai | |
| 2019/0069107 A1* | 2/2019 | Gandhi | H04R 25/305 |
| 2020/0103513 A1 | 4/2020 | Knaappila | |
| 2020/0322742 A1* | 10/2020 | Boretzki | H04R 25/70 |

OTHER PUBLICATIONS

Siements, "A world first: Enjoy better than normal hearing in demanding situations," Brochure Signia Carat, Year 2014, 16 pages.
Invitation to Pay Additional Fees and, Where Applicable, Protest Fee, for International Application PCT/US2019/056492, dated Jan. 24, 2020, 14 pages.
Invitation to Pay Additional Fees and, Where Applicable, Protest Fee, for International Application PCT/US2019/056486, dated Feb. 3, 2020, 12 pages.
"EasyTekApp. More convenience, more discretion, more functionality," https://www.bestsound-technology.co.uk/siemens-hearing-aids/wirless/ . . . , 2017, Sivantos Pte. Ltd. or its affiliates, 3 pages.

* cited by examiner

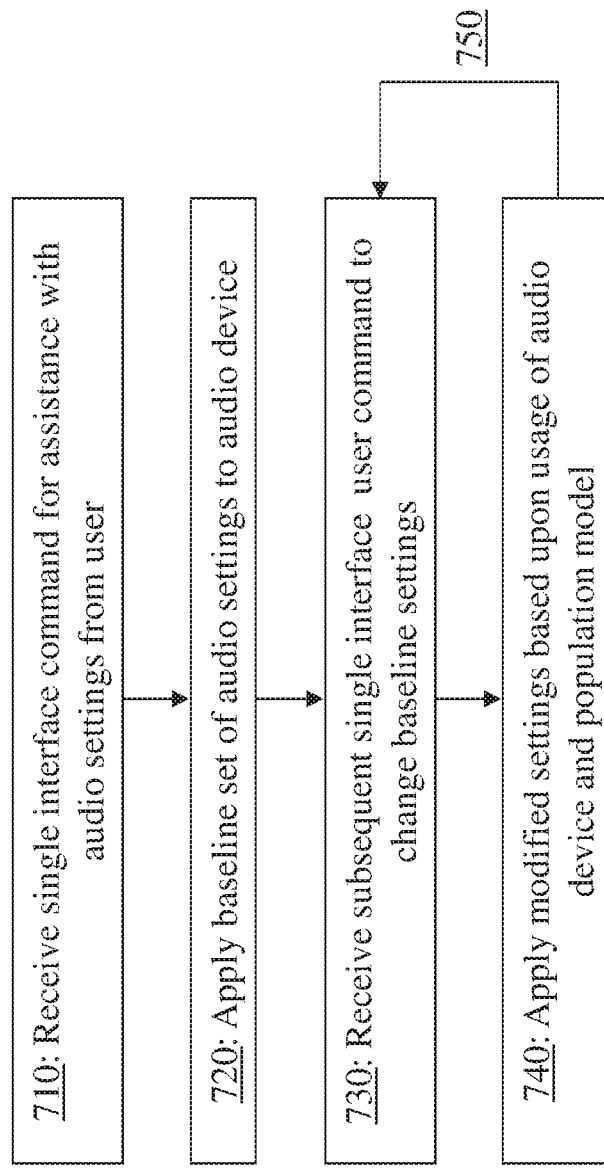

CONVERSATION ASSISTANCE AUDIO DEVICE PERSONALIZATION

PRIORITY CLAIM

This application is a divisional application of U.S. patent application Ser. No. 16/165,055, filed on Oct. 19, 2018, which is hereby incorporated by reference in its entirety.

TECHNICAL FIELD

This disclosure generally relates to audio devices. More particularly, the disclosure relates to conversation assistance audio devices with settings that are adjustable based upon user feedback.

BACKGROUND

Conversation assistance devices aim to make conversations more intelligible and easier to understand. These devices aim to reduce unwanted background noise and reverberation. While these devices can significantly enhance the day-to-day experience of users with mild to moderate hearing impairment, these devices can be challenging to personalize for a particular user.

SUMMARY

All examples and features mentioned below can be combined in any technically possible way.

Various implementations include conversation assistance audio devices with settings that are adjustable based upon user feedback. In some cases, the conversation assistance audio device is configured to use a set of simulated audio environments to personalize audio settings for a user. In other cases, the conversation assistance audio device is configured to iteratively adjust audio settings from a baseline set of audio settings in response to user commands.

In some particular aspects, a computer-implemented method of personalizing a conversation assistance audio device includes: presenting a user of the conversation assistance audio device with a set of simulated audio environments played back at the conversation assistance audio device; receiving feedback from the user about each simulated audio environment in the set of simulated audio environments; and adjusting at least one audio setting at the conversation assistance audio device based upon the feedback from the user and known audio characteristics of the set of simulated audio environments and the conversation assistance audio device.

In other particular aspects, a computer-implemented method of personalizing a conversation assistance audio device includes: receiving a command from a user for assistance with audio settings in the conversation assistance audio device; applying a baseline set of audio settings to the conversation assistance audio device in response to receiving the user command for assistance; receiving a user command to change the baseline set of audio settings; and applying a modified set of audio settings to the conversation assistance audio device in response to receiving the user command to change the baseline set of audio settings, where the modified set of audio settings are applied based upon usage of the conversation assistance audio device and a population model of usage of similar conversation assistance audio device.

Implementations may include one of the following features, or any combination thereof.

In particular cases, each simulated audio environment in the set includes audio playback at a substantially identical background noise level.

In certain aspects, each simulated audio environment in the set includes playback of a person speaking at a sound pressure level that is greater than the background noise level.

In some implementations, adjusting the at least one audio setting includes selecting a best-fit audio setting for the conversation assistance audio device based upon the feedback received from the user about all of the simulated audio environments in the set of simulated audio environments.

In particular cases, the set of simulated audio environments includes at least two simulated audio environments.

In certain implementations, the method further includes: providing an interface for receiving the feedback from the user, where the interface includes at least one actuatable mechanism for adjusting the at least one audio setting on the conversation assistance audio device, and where the interface is located on the conversation assistance audio device or a computing device connected with the conversation assistance audio device.

In some aspects, the at least one actuatable mechanism includes at least one of: a weighted scoring mechanism, a volume adjustor or a treble/bass adjustor.

In certain cases, the at least one audio setting on the conversation assistance audio device is adjusted in response to the user modifying the at least one actuatable mechanism on the interface.

In particular implementations, the method further includes scaling the adjustment to the at least one audio setting on the conversation assistance audio device based upon a scaling factor.

In some cases, the scaling factor includes an inference between audio characteristics of each of the simulated audio environments in the set of simulated audio environments and a model of real-world audio characteristics.

In certain aspects, the scaling factor includes a positive scaling factor, and scaling the adjustment to the at least one audio setting comprises positively scaling the at least one audio setting on the conversation assistance audio device.

In particular implementations, the method further includes creating a set of distinct audio modes based upon the feedback from the user and known audio characteristics of the set of simulated audio environments and the conversation assistance audio device.

In some cases, the set of distinct audio modes includes a set of user-selectable audio modes each correlated with distinct audio filters configured to enhance audibility of a range of frequencies for specific acoustic environments.

In certain aspects, the method further includes switching between distinct audio modes in the set of distinct audio modes in response to detecting a change in an acoustic signature of ambient sound detected at the conversation assistance audio device.

In particular cases, adjusting the at least one audio setting on the conversation assistance audio device includes adjusting a directivity of a microphone array in the conversation assistance audio device, adjusting a microphone array filter on the microphone array in the conversation assistance audio device, adjusting a volume of audio provided to the user at the conversation assistance audio device, adjusting parameters controlling wide dynamic range compression or adjusting gain parameters controlling the shape of the frequency versus gain function.

In some aspects, the method further includes providing a suggested audio mode for the conversation assistance audio device to the user based upon the feedback from the user and the known audio characteristics of the set of simulated audio environments and the conversation assistance audio device, prior to adjusting the at least one setting on the conversation assistance audio device.

In certain cases, adjusting the at least one audio setting at the conversation assistance audio device includes applying a signal processing modification in at least one of the conversation assistance audio device or a computing device connected with the conversation assistance audio device.

In some implementations, each simulated audio environment in the set of simulated audio environments comprises audio playback at a signal-to-noise (SNR) range in which audibility limits intelligibility.

In particular aspects, the SNR range is a value between approximately −5 and approximately 20.

In certain implementations, the user command for assistance with audio settings in the conversation assistance audio device includes a single interface command.

In some cases, the single interface command includes a single voice command, a single tactile command, or a single gesture command.

In particular implementations, the method of personalizing the conversation assistance audio device further includes iteratively performing: receiving a subsequent user command to change the modified set of audio settings; and applying a further modified set of audio settings to the conversation assistance audio device in response to receiving the subsequent user command, where the further modified set of audio settings are applied based upon the usage of the conversation assistance audio device and the population model of usage of similar conversation assistance audio device, and where the subsequent user command includes a single interface command.

In certain aspects, the baseline set of audio settings includes median audio settings for a respective plurality of audio parameters or user-defined audio settings for the respective plurality of audio parameters from a group of users.

In some cases the audio settings on the conversation assistance audio device include at least one of: a directivity of a microphone array in the conversation assistance audio device, a microphone array filter configuration on the microphone array in the conversation assistance audio device, a volume of audio provided to the user at the conversation assistance audio device, parameters controlling wide dynamic range compression or gain parameters controlling the shape of the frequency versus gain function.

In particular implementations, the baseline audio settings are applied in response to the single interface command without any intervening command.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

FIG. 7 shows a process flow diagram illustrating processes performed by the conversation assistance audio engine shown in FIG. 2.

Figure 1:
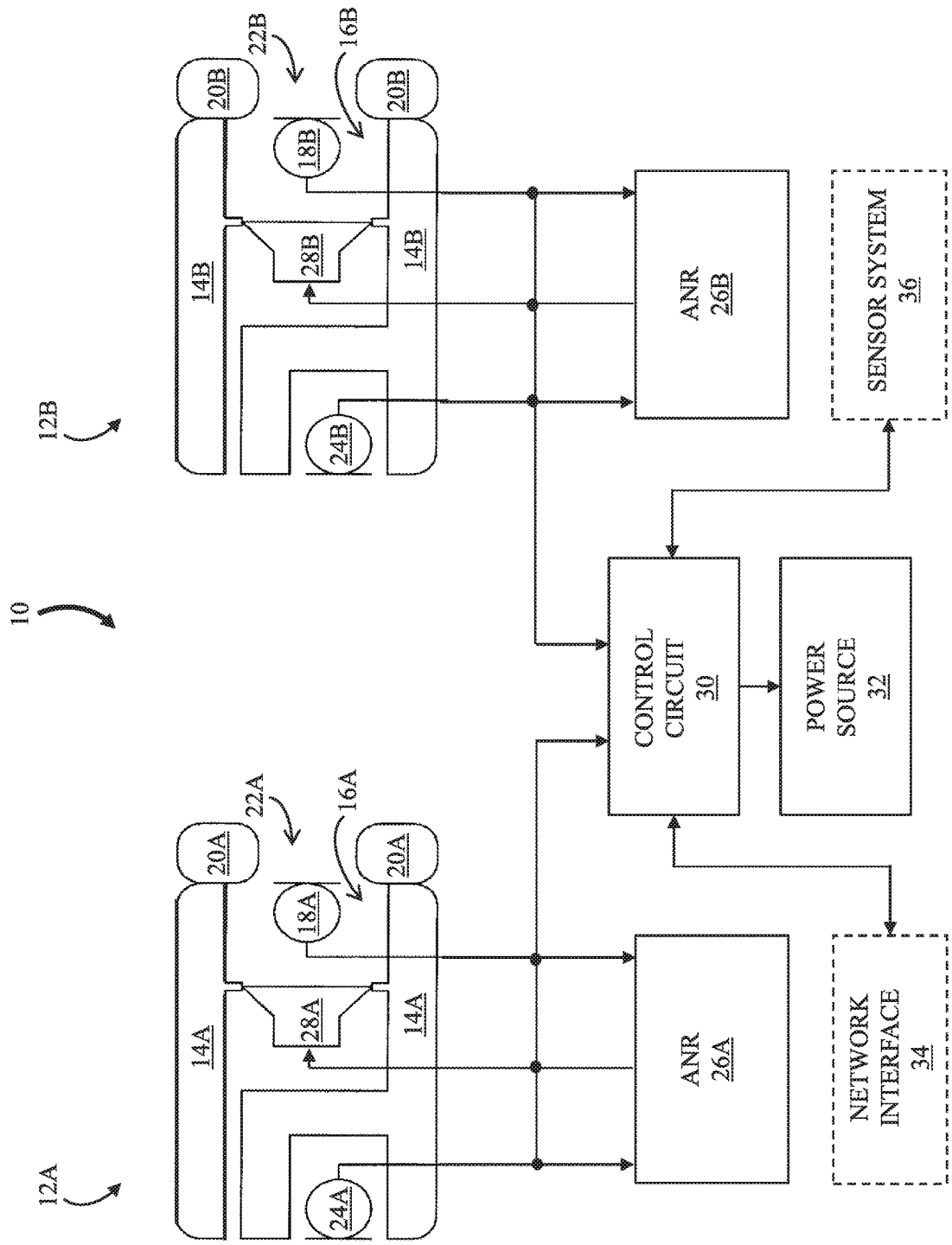
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that audio settings in a conversation assistance audio system can be beneficially tailored to a particular user. For example, a conversation assistance audio system can be configured to present a set of simulated environments to a user in order to elicit feedback for adjusting audio settings in the audio system. In other cases, the conversation assistance audio system is configured to provide a simplified command interface (e.g., a single interface command) for iteratively refining audio settings from baseline settings.

Commonly labeled components in the FIGURES are considered to be substantially equivalent components for the purposes of illustration, and redundant discussion of those components is omitted for clarity.

Conventional hearing assistance devices (or, hearing aids) are typically tested and adjusted by an audiology professional such as an audiologist in one or more appointments with the user. Interacting with a professional on an in-person basis can give the user confidence in the setup process, and can provide opportunities for refinement of device settings as conditions change or evolve.

However, a portion of the population can benefit from devices that enhance conversation and other select ambient acoustic signals, but may not wish to use a hearing assistance device and/or seek professional medical help. For many of these people, conversation assistance devices provide an attractive compromise between a hearing aid and receiving no hearing assistance. Despite the benefits of these conventional conversation assistance devices, it can be challenging to personalize the user experience without seeking professional medical help. Examples of conventional conversation assistance devices are described in U.S. Pat. No. 9,560,451 ("Conversation Assistance System"), which is incorporated by reference here in its entirety.

In contrast to conventional conversation assistance devices, various implementations include conversation assistance devices configured for a user with a software module or mobile application that permits the user to personalize the device without consulting an audiologist or other hearing assistance professional. The approaches described according to various implementations present a user with a set of simulated audio environments via the conversation assistance audio device. The approaches also involve adjusting one or more audio settings on the conversation assistance audio device based upon user feedback and known audio characteristics of the set of simulated audio environments and the conversation assistance audio device.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, ANR can be combined with other audio functions in headphones, such as conversation enhancing functions, as described in U.S. Pat. No. 9,560,451. While the term ANR is used to refer to acoustic output of anti-noise sounds, this term can also include controllable noise canceling (CNC), which permits control of the level of anti-noise output, for example, by a user. In some examples, CNC can permit a user to control the volume of audio output regardless of the ambient acoustic volume.

Aspects and implementations disclosed herein may be applicable to a wide variety of personal audio devices, such as wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 (e.g., a conversation assistance audio device) having two earpieces 12A and 12B, each configured to direct sound towards an ear of a user. Features of the personal audio device 10 can be particularly useful as a wearable audio device, e.g., a head and/or shoulder-worn conversation assistance device. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR (which may include CNC), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, California, USA; Spotify®, provided by Spotify USA, Inc., of New York, NY, USA); or vTuner®, provided by vTuner.com of New York, NY, USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling conversation assistance functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling conversation assistance functions, as well as digital signal processing and equalization. Additional details may be found in U.S. Patent Application Publication 20140277644, U.S. Patent Application Publication 20170098466, and U.S. Patent Application Publication 20140277639, the disclosures of which are incorporated here by reference in their entirety.

Personal audio device 10 can also include a sensor system 36 coupled with control circuit 30 for detecting one or more conditions of the environment proximate personal audio device 10. Sensor system 36 can include one or more local sensors (e.g., inner microphones 18 and/or outer microphones 24) and/or remote or otherwise wireless (or hardwired) sensors for detecting conditions of the environment proximate personal audio device 10 as described herein. As described further herein, sensor system 36 can include a plurality of distinct sensor types for detecting location-based conditions proximate the personal audio device 10.

According to various implementations, the conversation assistance devices (which may be, for example, personal audio device 10 of FIG. 1) described herein can be personalized according to user feedback. These particular implementations can allow a user to experience dynamic, personalized conversation assistance throughout differing acoustic environments. These implementations can enhance the user experience in comparison to conventional conversation assistance systems.

Figure 2:
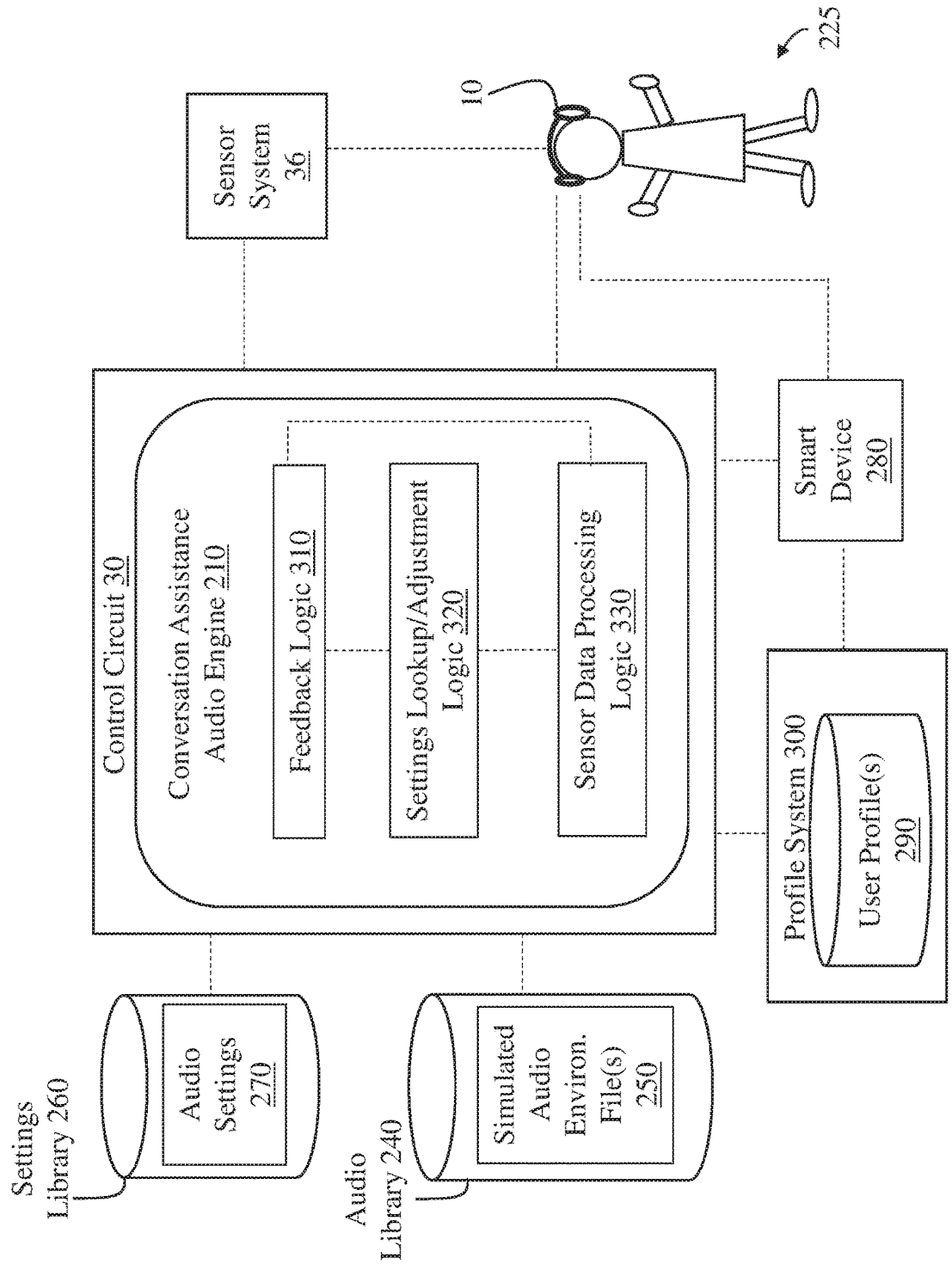
FIG. 2 shows a schematic data flow diagram illustrating control processes performed by a conversation assistance audio engine in the personal audio device of FIG. 1.

As described with respect to FIG. 1, control circuit 30 can execute (and in some cases store) instructions for controlling audio functions in personal audio device 10 and/or a smart device coupled with the personal audio device 10 (e.g., in a network). As shown in FIG. 2, control circuit 30 can include a conversation assistance audio engine 210 configured to implement modifications in audio settings (e.g., settings in ANR circuits 26A,B, FIG. 1) for outputs at the transducer (e.g., speaker) 28 (FIG. 1) based upon user feedback to one or more prompts. Additionally, one or more portions of the conversation assistance audio engine 210 (e.g., software code and/or logic infrastructure) can be stored on or otherwise accessible to a smart device 280, which may be connected with the control circuit 30 by any communications connection described herein. As described herein, particular functions of the conversation assistance audio engine 210 can be beneficially employed on the smart device 280.

Figure 3:
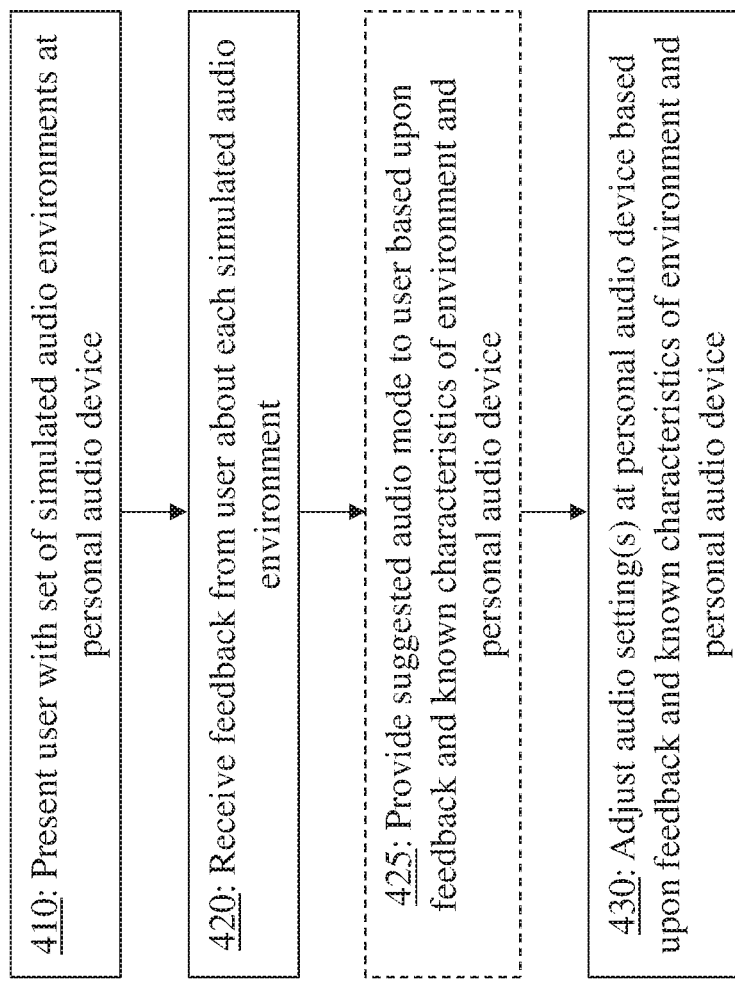
FIG. 3 shows a process flow diagram illustrating processes performed by the conversation assistance audio engine shown in FIG. 2.
Figure 4:
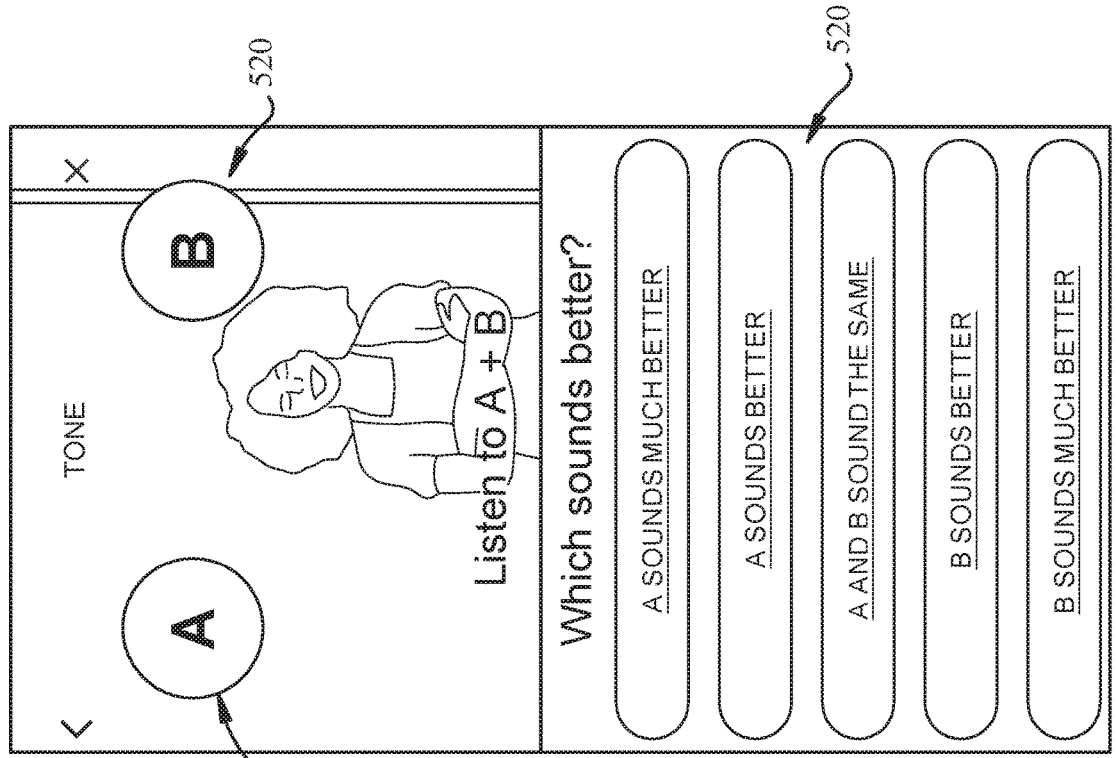
FIG. 4 shows an example interface for personalizing a conversation assistance audio device according to various implementations.
Figure 4:
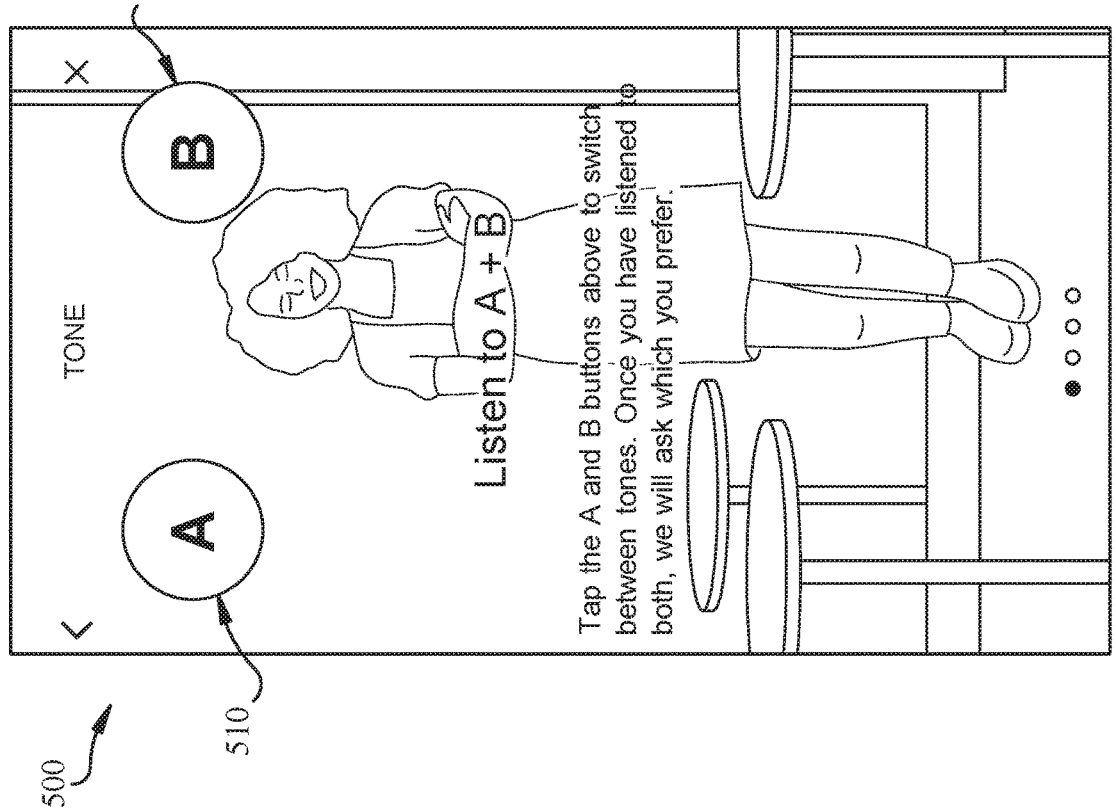
Figure 5:
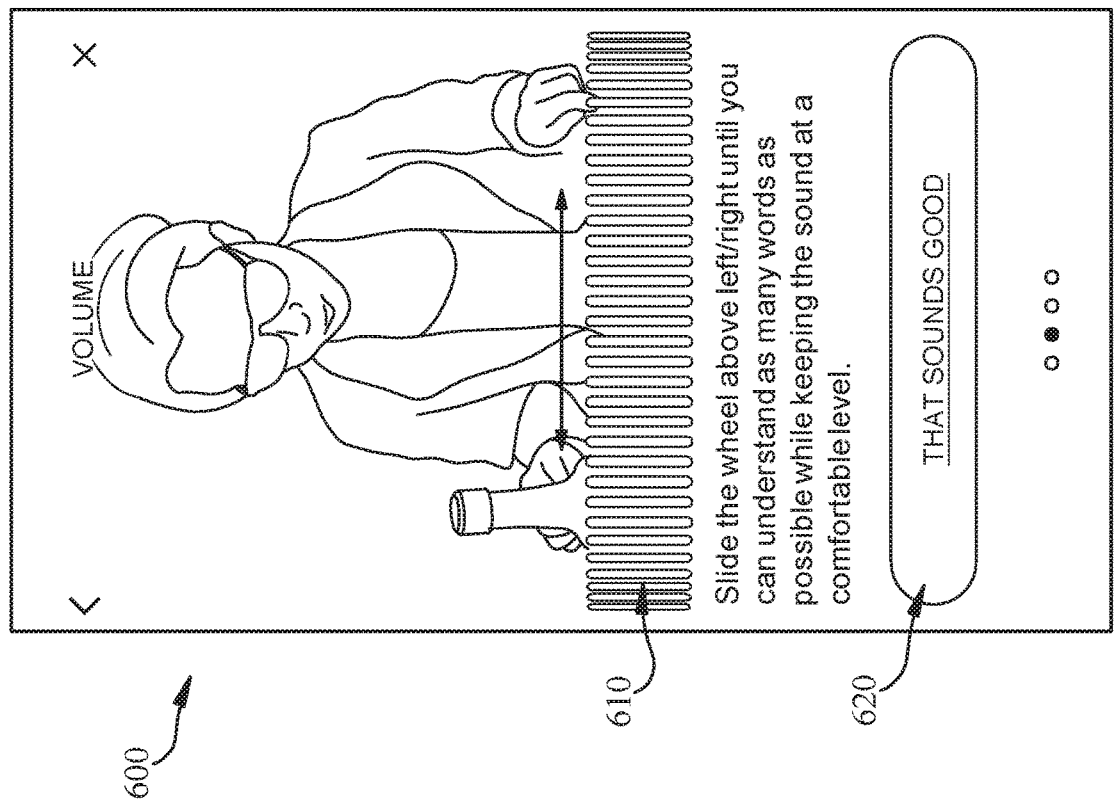
FIG. 5 shows another example interface for personalizing a conversation assistance audio device according to various implementations.
Figure 6:
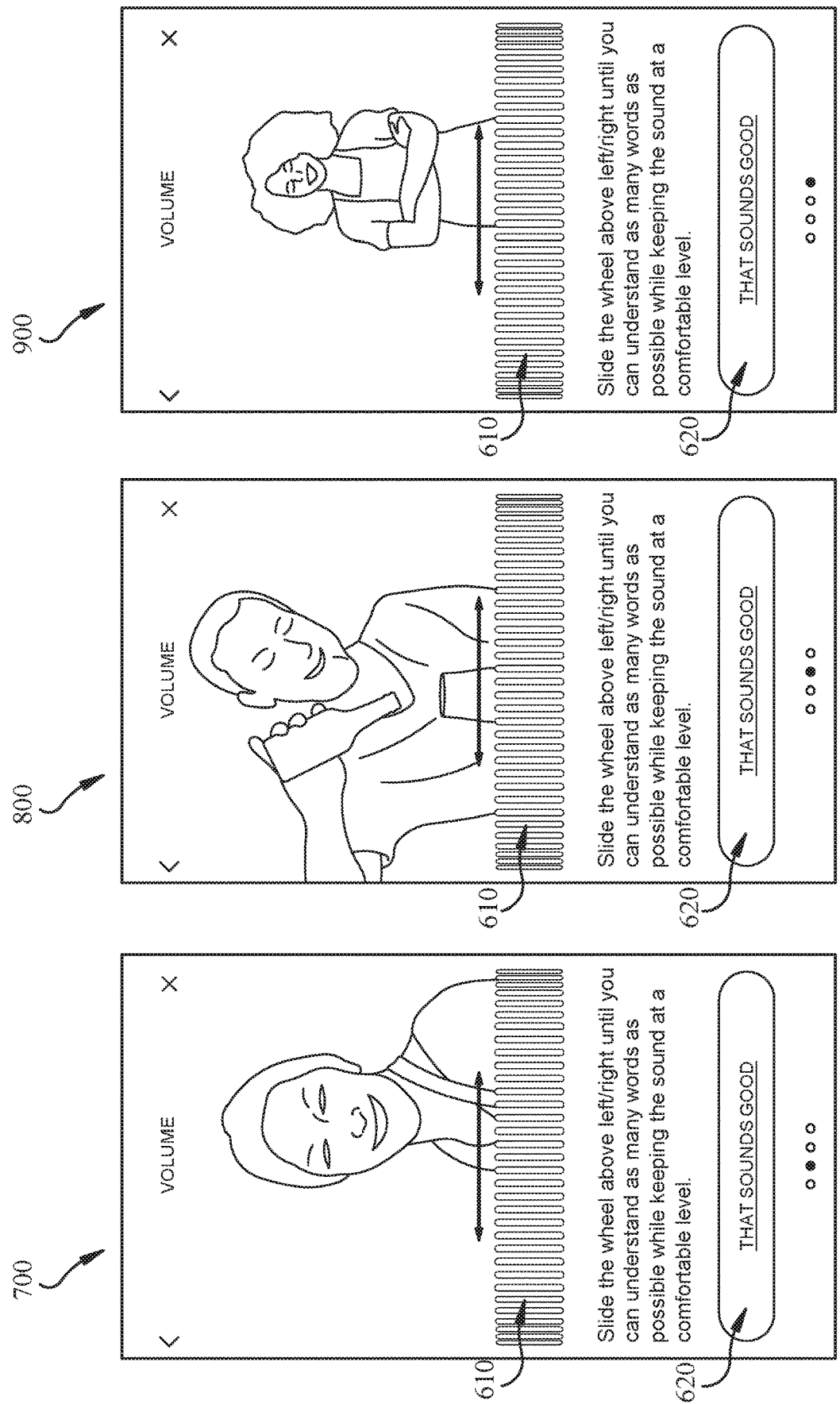
FIG. 6 shows a set of example interfaces for personalizing a conversation assistance audio device according to various implementations.

In particular, FIG. 2 shows a schematic data flow diagram illustrating a control process performed by conversation assistance audio engine 210 in connection with a user 225. It is understood that in various implementations, user 225 can include a human user. FIG. 3 shows a process flow diagram illustrating processes performed by conversation assistance audio engine 210 according to various implementations. FIGS. 4-6 show schematic depictions of an interfaces presented to the user 225 to perform control operations of the personal audio device 10. FIGS. 1-6 are referred to simultaneously, with particular emphasis on FIGS. 2 and 3.

Returning to FIG. 2, data flows between conversation assistance audio engine 210 and other components in personal audio device 10 are shown. It is understood that one or more components shown in the data flow diagram may be integrated in the same physical housing, e.g., in the housing of personal audio device 10, or may reside in one or more separate physical locations.

Conversation assistance audio engine 210 can be coupled (e.g., wirelessly and/or via hardwired connections in personal audio device 10) with an audio library 240, which can include simulated audio environment files 250 for playback (e.g., streaming) at personal audio device 10.

Audio library 240 can be associated with digital audio sources accessible via network interface 34 (FIG. 1) described herein, including locally stored, remotely stored or Internet-based audio libraries. Simulated audio environment files 250 are configured for playback at the personal audio device 10 to provide the user 225 with an immersive audio experience similar to an environment that the user 225 may encounter while wearing the personal audio device 10. In some particular implementations, a simulated audio environment file 250 can include playback of a speaker (e.g., a person speaking) along with background noise or other ambient sound. In certain cases, the speaker is played back at a decibel level that is greater than the decibel level of the background noise. The simulated audio environment files 250 can include binaural recordings of an environment, for example, a binaural recording of a speaker in an automobile, or a binaural recording of a speaker at an airport lounge.

In certain implementations, a simulated audio environment can include a coffee shop or restaurant, train station, airplane cabin, live sporting venue, etc. These simulated audio environments replicate real-world environments that can make hearing challenging for many users. In particular cases, the simulated audio environment file 250 initiates audio playback at the personal audio device 10 at a signal-to-noise (SNR) ratio in which audibility limits intelligibility. In some cases, this SNR range is between approximately −5 dB SNR and approximately 20 dB SNR. In certain implementations, a plurality of simulated audio environments are available for playback at a substantially identical background noise level. In these implementations, a user 225 can experience a set of two or more simulated audio environments at a substantially identical background noise level in order to improve the accuracy of the feedback received from that user 225 about that type of environment. In one example, the user 225 is exposed to at least two simulated audio environments within a narrow range of background noise (e.g., approximately 5 dB SNR or less of background noise variation) and asked for feedback about those environments. In a particular case, each of the simulated audio environments can simulate a common setting, e.g., a coffee shop or sporting venue, but with a distinct speaker in each environment.

Conversation assistance audio engine 210 can also be coupled with a settings library 260 for controlling audio setting(s) on the personal audio device 10. The settings library 260 can include a group of audio settings 270 for applying different modifications to incoming acoustic signals received at the personal audio device 10. As described herein, the settings 270 can be adjusted based upon user feedback in response to experiencing one or more of the simulated audio environments. In certain cases, adjusting the audio settings 270 in the personal audio device can include adjusting one or more of: a directivity of a microphone array in the personal audio device 10, a microphone array filter on the microphone array in the personal audio device 10, a volume of audio provided to the user 225 at the personal audio device 10, parameters controlling wide dynamic range compression gain parameters controlling the shape of the frequency versus gain function or per-ear settings (e.g., dynamic range compression parameters on a per-ear basis).

When the simulated audio environment file 250 is played back at the personal audio device 10, the user 225 hears the intended SNR for that particular simulated audio environment according to current settings 270 for the personal audio device 10. That is, the simulated audio environment file 250 is configured to provide the user 225 with audio playback at a specified sound pressure level, background/foreground noise ratio, and noise cancelling level to simulate how that environment would be perceived according to the current settings 270 on the personal audio device 10. Additionally, the simulated audio environment file 250 can include any effect of signal processing found in a hearing aid. In some particular implementations, the simulated audio environment file 250 can also include a video file (or be paired with a corresponding video file) for playback on an interface (e.g., an interface on a smart device 280 and/or on the personal audio device 10. The video file can be synchronized with the audio playback at the personal audio device 10 to provide the user 225 with an immersive simulated experience. Playback of the audio and/or video can be controlled by the control circuit 30 and/or a processing component on a paired smart device 280. In various implementations, the simulated audio environment file 250 can be stored on the smart device 280, streamed from another source (e.g., cloud-based storage device(s)) and/or stored on the personal audio device 10. In particular implementations where the personal audio device 10 does not have wireless technology, the simulated audio environment file(s) 250 can be stored on the personal audio device 10, enabling a stand-alone personalization process. In other particular implementations where the personal audio device 10 relies upon the Bluetooth Low Energy (BLE) communication protocol, high-fidelity audio streaming may not be possible. In these cases, the simulated audio environment file 250 is beneficially stored on the personal audio device 10 in order to enable high-fidelity playback that is not degraded by the low-bitrate encoding of the BLE link.

As noted herein, conversation assistance audio engine 210 can also be coupled with smart device 280 that has access to one or more user profiles 290 (e.g., in a profile system 300) or biometric information about user 225. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with user 225, and can include one or more network interfaces for interacting with control circuit 30 and other components in personal audio device 10 (FIG. 1). In some example implementations, smart device 280 can be utilized for: connecting personal audio device 10 to a Wi-Fi network; creating a system account for the user 225; setting up music and/or location-based audio services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases smart device 280 may also be used for: music services setup; browsing of content; setting preset assignments on the audio playback devices; transport control of the audio playback devices; and selecting personal audio devices 10 (or other playback devices) for content playback. Smart device 280 can further include embedded sensors for measuring biometric information about user 225, e.g., travel, sleep or exercise patterns; body temperature; heart rate; or pace of gait (e.g., via accelerometer(s)). As noted herein, smart device 280 can be used to synchronize playback of simulated audio environment files 250 to provide an immersive audio (and in some cases, video) simulation to the user 225. Further, it is understood that one or more functions of the conversation assistance audio engine 210 can be stored, accessed and/or executed at smart device 280.

User profiles 290 may be user-specific, community-specific, device-specific, location-specific or otherwise associated with a particular entity such as user 225. User profiles 290 can include user-defined playlists of digital music files, audio messages stored by the user 225 or another user, or other audio files available from network audio sources coupled with network interface 34 (FIG. 1), such as network-attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the audio personal audio device 10 over a wide area network such as the Internet. In some cases, profile system 300 is located in a local server or a cloud-based server, similar to any such server described herein. User profile 290 may include information about audio settings associated with user 225 or other similar users (e.g., those with common hearing attributes or demographic traits), frequency with which particular audio settings are changed by user 225 or other similar users, etc. Profile system 300 can be associated with any community of users, e.g., a social network, subscription-based music service, and may include audio preferences, histories, etc. for user 225 as well as a plurality of other users. In particular implementations, profile system 300 can include user-specific preferences (as profiles 290) for audio settings 270. Profiles 290 can be customized according to particular user preferences, or can be shared by users with common attributes.

Conversation assistance audio engine 210 is also configured to receive sensor data from sensor system 36. Additionally, as noted herein, the conversation assistance audio engine 210 can receive sensor data from the smart device 280. This sensor data can be used to control various functions such as ANR (and CNC) functions, dynamic volume control, notifications, etc. In some cases, sensor system 36 can include one or more of the following sensors: a position tracking system; an accelerometer/gyroscope; a microphone (e.g., including one or more microphones, which may include or work in concert with microphones 18 and/or 24); and a wireless transceiver. These sensors are merely examples of sensor types that may be employed according to various implementations. It is further understood that sensor system 36 can deploy these sensors in distinct locations and distinct sub-components in order to detect particular environmental information relevant to user 225 and the personal audio device 10.

A position tracking system can include one or more location-based detection systems such as a global positioning system (GPS) location system, a Wi-Fi location system, an infra-red (IR) location system, a Bluetooth beacon system, etc. In various additional implementations, the position tracking system can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. The position tracking system can be configured to detect changes in the physical location of the personal audio device 10 and/or user 225 (where user 225 is separated from personal audio device 10) and provide updated sensor data to the conversation assistance audio engine 210. The position tracking system can also be configured to detect the orientation of the user 225, e.g., a direction of the user's head, or a change in the user's orientation such as a turning of the torso or an about-face movement. In particular implementations, the orientation tracking system can be used to recommend settings by comparing real-world characteristics (e.g., head tracking position) of the user's orientation with simulation preferences for the user 225. In additional implementations, head-tracking can be used to adjust the simulations for a more realistic personalization experience. For example, the orientation tracking system can include a head tracking engine for detecting the head position of user 225, and the conversation assistance audio engine 210 can adjust playback of the simulated audio environment based upon the head position of the user 225. The conversation assistance audio engine 210 can use head-related transfer functions (HRTFs) to simulate the audio environment relative to known position of the user's head in space from the orientation tracking system An accelerometer/gyroscope can include distinct accelerometer components and gyroscope components, or could be collectively housed in a single sensor component, e.g., an inertial measurement unit (IMU). This component may be used to sense gestures based on movement of the user's body (e.g., head, torso, limbs) while the user is wearing the personal audio device 10 or interacting with another device (e.g., smart device 280) connected with personal audio device 10. As with any sensor in sensor system 36, the accelerometer/gyroscope may be housed within personal audio device 10 or in another device connected to the personal audio device 10.

The microphone (which can include one or more microphones, or a microphone array) can have similar functionality as the microphone(s) 18 and 24 shown and described with respect to FIG. 1, and may be housed within personal audio device 10 or in another device connected to the personal audio device 10. As noted herein, microphone(s) may include or otherwise utilize microphones 18 and 24 to perform functions described herein. Microphone(s) can be positioned to receive ambient acoustic signals (e.g., acoustic signals proximate personal audio device 10). In some cases, these ambient acoustic signals include speech/voice input from user 225 to enable voice control functionality. In some other example implementations, the microphone can detect the voice of user 225 and/or of other users proximate to or interacting with user 225. In particular implementations, conversation assistance audio engine 210 is configured to analyze one or more voice commands from user 225 (via microphone), and modify the applied audio settings 270 on the personal audio device 10. In some cases, the conversation assistance audio engine 210 can include sensor data processing logic for analyzing voice commands, including, e.g., natural language processing (NLP) logic or other similar logic.

As noted herein, the sensor system 36 can also include a wireless transceiver (comprising a transmitter and a receiver), which may include, a Bluetooth (BT) or Bluetooth Low Energy (BTLE) transceiver or other conventional transceiver device. The wireless transceiver can be configured to communicate with other transceiver devices in distinct components (e.g., smart device 280).

It is understood that any number of additional sensors could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

According to various implementations, control circuit 30 includes the conversation assistance audio engine 210, or otherwise accesses program code for executing processes performed by conversation assistance audio engine 210 (e.g., via network interface 34). Conversation assistance audio engine 210 can include logic for processing feedback from the user 225 about the simulated audio environments. Additionally, conversation assistance audio engine 210 can include logic for looking up and adjusting audio settings according to feedback received from the user 225 and known characteristics of the simulated audio environment. The conversation assistance audio engine 210 can also include logic for processing sensor data from the sensor system, e.g., data about ambient acoustic signals from microphones, data about a location of the personal audio device 10, biometric data from a smart device, and/or usage data from a smart device.

In various implementations, the conversation assistance audio engine 210 presents the user 225 of the personal audio device (e.g., conversation assistance audio device) 10 with a set of simulated audio environments, which can also include video playback, e.g., at a video player such as smart device 280. The simulated audio environment files 250 can be played back at the transducers (e.g., transducers 28A,B, FIG. 1) at the personal audio device 10. The user 225 provides feedback about each simulated audio environment, either directly to the control circuit 30, e.g., via an interface on the personal audio device 10, or to smart device 280 (e.g., via an interface).

As noted herein, conversation assistance audio engine 210 can include logic for performing audio control functions according to various implementations. FIG. 3 shows a flow diagram illustrating processes in conversation assistance audio control performed by conversation assistance audio engine 210 and its associated logic.

As also noted herein, the conversation assistance audio engine 210 is configured to present the user 225 of the personal audio device 10 with a set of simulated audio environments (simulated audio environment files 250), played back at personal audio device 10 (process 410, FIG. 3). If more than one simulated audio environment is presented to the user 225, those simulated audio environments can be presented in a series, with one following another after a designated period. As described herein, in various implementations when two or more simulated audio environments are presented to the user 225, those environments can be presented with a substantially identical background noise level. In certain implementations, a preliminary process (not shown) can include the user 225 initiating a conversation assistance personalization (or testing) process, for example, via an interface on the smart device 280 and/or via an interface on the personal audio device 10. In some cases, the user 225 can initiate the personalization/testing process through a software application (or, app) running on the smart device 280 and/or the personal audio device 10. In other cases, the conversation assistance audio engine 210 can prompt the user 225 to begin a personalization process, e.g., using any prompt described herein.

According to various implementations, the set of simulated audio environments are presented to the user with a predefined set of audio settings 270. In certain cases, these predefined settings 270 are default settings for the personal audio device 10, e.g., standard settings designed to function most effectively for the population of potential users of personal audio device 10 and similar devices. In other cases, the predefined settings are saved in the personal audio device 10 based upon prior usage, e.g., if the user 225 or another prior user of the personal audio device 10 has already defined settings for the device. In still other cases, the predefined settings are based upon one or more user profile(s) 290, which can be attributed to the user 225 and/or to other users. In certain cases, the profile-based settings can be defined by settings selected or positively verified by a plurality of users in a community or network.

After presenting the user 225 with the set of simulated audio environments, the conversation assistance audio engine 210 is configured to receive feedback from the user 225 about the about each simulated audio environment (process 420, FIG. 3). The conversation assistance audio engine 210 can include feedback logic 310 for analyzing the feedback from the user 225 about the simulated audio environment file 250. In some cases, feedback includes negative feedback from user 225 about the simulated audio environment file 250 (e.g., "I cannot hear this speaker clearly", "No", "Change", "Louder", "Quieter" or a similar response to a user interface prompt such as a thumbs-down, "No" vote, etc.). In other cases, feedback includes positive feedback from user 225 about the simulated audio environment file 250 (e.g., "Yes", "Good", "Loud and clear" or a similar response to a user interface prompt such as a thumbs-up, "Yes" vote, etc.). In various implementations, user 225 can provide either a verbal response or a response to a user interface prompt. In particular cases, the feedback can include adjustment of an interface control such as a knob, button, toggle, or voting mechanism.

Example interfaces are shown in FIGS. 4-6, which illustrate just some of the various functions of the personal audio device 10 and the conversation assistance audio engine 210. For example, FIG. 4 shows an example interface 500 for adjusting tone settings in the personal audio device. The interface 500 is shown at an initial state (a) and a follow-up state (b). This example interface 500 depicts a speaker in a shop environment such as a coffee shop. The interface 500 allows the user 225 to provide feedback about the characteristics of the simulated audio environment file 250 while listening to that file. While wearing the personal audio device 10, the user 225 can interact with the interface 500 on a smart device 280 and/or the personal audio device 10. In this particular example, the interface 500 includes a plurality of actuatable mechanisms (e.g., buttons) 510 for providing feedback to the conversation assistance audio engine 210. The user 225 can select between tones A and B (shown in initial state (a)), and then provide feedback about those tones (shown in follow-up state (b)). In this example implementation, the user 225 can actuate one of the actuatable mechanisms 510 such as tones A or B (e.g., via a touch screen command, voice command, or gesture command), and can provide feedback about the tones using interface 500 or another interface such as a voice or gesture-based interface. In the particular example shown, the user 225 can elect to use the touch screen to initiate tone A and tone B, and then provide feedback in a weighted scoring mechanism 520 (which may include buttons or similar actuatable mechanism(s)). In this example, the weighted scoring mechanism 520 provides a plurality of options between the two tones A and B, e.g., "A sounds much better", "A sounds better", "A and B sound the same", "B sounds better" and "B sounds much better". In particular implementations, the interface 500 can include instructions, e.g., text instructions on an interface (as shown in initial state (a)), or audio instructions provided via one or more transducers. While a weighted scoring mechanism is shown in FIG. 4, additional actuatable mechanisms could also be used to solicit feedback, such as a volume adjustor and/or treble/bass adjustor.

FIG. 5 shows an additional example interface 600. In this example, the interface 600 can be used to control the settings for playback volume. This example interface 600 depicts a speaker in a restaurant environment such as an outdoor café. The interface 600 allows the user 225 to provide feedback about the subjective quality of the simulated audio environment file 250 while listening to that file. While wearing the personal audio device 10, the user 225 can interact with the interface 600 on the smart device 340 and/or the personal audio device 10. In this particular example, the interface 600 includes at least one actuatable mechanism (e.g., volume adjustor 610) for providing feedback to the conversation assistance audio engine 210 about the volume of the playback of the simulated audio environment file 250. The user 225 can slide the adjustor 610 across a range of values to modify the playback volume, and then actuate another actuatable mechanism (e.g., button 620) to verify that the volume level is acceptable (e.g., "That Sounds Good"). The user 225 can also adjust the volume adjustor and provide a voice command or gesture command to verify that the volume level is acceptable. In particular implementations, the interface 600 can include instructions, e.g., text instructions on an interface (as shown in initial state (a)), or audio instructions provided via one or more transducers.

FIG. 6 shows three distinct interfaces 700, 800, 900, each for adjusting volume settings in the personal audio device 10 via the conversation assistance audio engine 210. These interfaces 700, 800, 900 are each associated with a distinct simulated audio environment file 250, that is, each of the interfaces can be presented to the user 225 at a distinct time (e.g., in series, or separated by a designated period). In this example implementation, interfaces 700, 800, 900 can depict different speakers (e.g., employees) at a restaurant. Similar to interface 600 in FIG. 5, each of these interfaces 700 can include at least one actuatable mechanism (e.g., volume adjustor 610) for providing feedback to the conversation assistance audio engine 210 about the volume of the playback of the simulated audio environment file 250. The user 225 can slide the adjustor 610 across a range of values to modify the playback volume, and then actuate another actuatable mechanism (e.g., button 620) to verify that the volume level is acceptable (e.g., "That Sounds Good"). The user 225 can also adjust the volume adjustor and provide a voice command or gesture command to verify that the volume level is acceptable. In the example depiction in FIG. 6, the simulated audio environment file 250 associated with each of the interfaces 700, 800, 900 can include binaural playback at a substantially identical sound pressure level, with background and speaker volume ratios remaining approximately equal across all samples. In this scenario, the user 225 is provided with three visually distinct simulations that have substantially identical audio characteristics. As discussed further herein, using two or more simulated audio environments can aid the conversation assistance audio engine 210 in selecting a best-fit audio setting(s) (or a plurality of situation-based best-fit audio settings) for the personal audio device 10, for example, using feedback from all of the simulated audio environments scored by the user 225.

While some examples of feedback are described with respect to a user interface, it is understood that feedback and/or other audio inputs such as sensor data can include an audio signal, and may be analyzed using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, conversation assistance audio engine 210 (and logic therein) can use these acoustic features from feedback or other audio inputs, and metadata features from the simulated audio environment files 250, to perform statistical and probabilistic modeling in order to recommend or select audio settings 270 for the user 225 in accordance with other functions. As noted herein, in various implementations, the statistical and probabilistic modeling enables the conversation assistance audio engine 210 to recommend or select audio settings 270 for real-world usage (outside of the simulated environment) based upon the user adjustments in the simulated environment.

Returning to FIG. 2, and as noted herein, the conversation assistance audio engine 210 can include feedback logic 310 for processing feedback received from the user 225, e.g., via one or more interfaces. The feedback logic 310 can be connected with settings lookup/adjustment logic 320, as well as sensor data processing logic 330, and can provide feedback, e.g., to the settings lookup/adjustment logic 320 for use in adjusting the settings 270 on the personal audio device 10. The sensor data processing logic 330 can also provide sensor data to the settings lookup/adjustment logic 320 for use in adjusting the settings 270 on the personal audio device 10. In some cases, feedback logic 310 can be configured to teach sensor data processing logic 330 and settings lookup/adjustment logic 320 about preferences of user 225, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic 310 can be configured to analyze feedback and enhance future operations of conversation assistance audio engine 210. It is further understood that feedback logic 310, settings lookup/adjustment logic 320 and/or sensor data processing logic 330 may be interconnected in such a manner that these components act in concert or in reliance upon one another.

In some cases, the feedback logic 310 is configured to process a command or request from the user 225 and categorize that command or request in terms of a settings adjustment for the personal audio device 10. For example, the feedback logic 310 can be configured to translate the user commands and/or requests made via one or more interfaces into a value adjustment for the corresponding audio settings 270. As noted herein, this value adjustment is sent to the settings lookup/adjustment logic 320 for determining a corresponding settings adjustment based upon the user feedback. The feedback logic 310 can be configured to translate the adjustment within the simulated audio environment file 250 into an adjustment value for one or more settings on the personal audio device 10. That is, the adjustment within the simulation interface may involve a manageable number of variables for the user 225, such as tone or volume, but the audio settings 270 can include a variety of potential adjustments to meet the desired audio output of the user 225 at the personal audio device 10. In this sense, the feedback logic 310 translates the adjustment to the variables in the simulation with adjustment values to audio settings on the personal audio device 10, e.g., a directivity of a microphone array, a microphone array filter, a volume of audio provided to the user, parameters controlling wide dynamic range compression or gain parameters controlling the shape of the frequency versus gain function. In some cases, these translations are made using a relational database or indexed data structure.

In some example implementations, the user 225 can set a desired wide dynamic range compression (WDRC) value (also referred to as World Volume herein) on the personal audio device 10 using interface adjustments based upon the simulated audio environment file 250. Additional example implementations can include simulating multiple sound pressure levels (SPLs) in the simulated audio environment file 250, and adjusting the WDRC (in the audio settings 270) to match a real-world environment based upon one or more selected SPLs from the simulated environment. While SPL and WDRC are used as examples, the conversation assistance audio engine 210 can be configured to actively make setting adjustments, or recommend settings (or adjustments) based upon any variable correlated between the simulated environment and a real-world environment.

As shown in FIG. 3, after receiving feedback from the user 225 about the simulated audio environment(s), the conversation assistance audio engine 210 is further configured to adjust at least one audio setting at the personal audio device 10 based upon the feedback from the user 225 and known audio characteristics of the set of simulated audio environments (simulated audio environment files 250) and the personal audio device 10 (process 430, FIG. 3).

In some particular implementations, this process can include selecting a best-fit audio setting for the conversation assistance audio device based upon the feedback from the user 225. In these cases, the settings lookup/adjustment logic 320 can select a closest setting value for the adjustment indicated by the feedback (as provided by feedback logic 310). In some cases, the best-fit audio setting can be selected using feedback from the user 225 about two or more simulated audio environments, e.g., where the user 225 provides distinct feedback in at least one adjustment factor across one or more of the audio environments. In this case, the conversation assistance audio engine 210 (e.g., feedback logic 310) can average, weight or otherwise account for differences in feedback values for adjustment mechanisms across a plurality of simulated audio environments. In some particular implementations, the conversation assistance audio engine 210 can determine a best-fit audio setting adaptively, e.g., by requiring that the user 225 select a setting in a sufficient number of simulated audio environments or with a narrow enough range between value selections to meet a threshold confidence interval. In other cases, the conversation assistance audio engine 210 can select the best-fit setting once feedback is received across a threshold number of settings at distinct sound pressure levels. The conversation assistance audio engine can interpolate a WDRC setting value for the personal audio device using a WDRC v. input SPL curve. Additionally, the feedback logic 310 and/or settings lookup/adjustment logic 320 can include an error metric that correlates the difference between the recommended audio setting 270 from the user adjustments in the simulation and the audio setting 270 that the user 225 ultimately selects after use in a real-world setting. The error metric can be updated over time to train the logic and minimize the difference between the recommended and selected settings.

In some particular implementations, the audio setting(s) 270 adjustment is scaled based upon a scaling factor. For example, a scaling factor can be applied to the audio setting adjustment to account for distinctions between user perception of audio content in a demonstration setting versus in a real-world setting. In one particular implementation, the scaling factor includes an inference between audio characteristics of each of the simulated audio environments and a model of real-world audio characteristics. This inference can be based upon data gathered from test users, published research and/or user feedback. For example, the scaling factor can be saved in a user profile 290 or can be applied by settings lookup/adjustment logic 320 according to user settings, profile characteristics, feedback received from the user 225 or data gathered from the sensor system 36. In one example, the conversation assistance audio engine 210 applies a positive scaling factor to user adjustments, e.g., to volume adjustments, including positively scaling the audio setting 270 on the personal audio device 10. This positive scaling factor infers that users will adjust the setting (e.g., volume) in the simulated environment to a lesser extent than they would adjust that same setting in a real-world use environment. In various implementations, the scaling factor(s) can be adjusted over time, using any machine learning engine described herein. For example, individual scaling factors can be refined over time based upon adjustments made by the user 225 to his/her personal audio device 10. Additionally, default scaling factors for the personal audio device 10 can be adjusted and/or refined based upon adjustment data gathered from personalization adjustments and/or demonstration-based adjustments made by users of a group of audio devices. As a greater number of users perform adjustments, the conversation assistance audio engine 210 can identify trends in usage and improve scaling factor accuracy using one or more input parameters, e.g., age, gender, initial World Volume setting, etc.

In some particular implementations, the conversation assistance audio engine 210 is further configured to create a set of distinct audio modes based upon the feedback from the user 225 and known audio characteristics of the set of simulated audio environments and the personal audio device 10. For example, the distinct audio modes can be created according to user responses from one or more simulated audio environments. In certain cases, the conversation assistance audio engine 210 can create a set of user-selectable audio modes each correlated with distinct audio filters configured to enhance audibility of a range of frequencies for specific acoustic environments. According to some implementations, the distinct audio modes can be intended for use in distinct real-world environments. Audio modes can include "quiet conversation", "loud room", "low-frequency noise", or similar categories. The conversation assistance audio engine 210 can dynamically switch between modes based upon user feedback and/or sensor data from the sensor system 36. In some cases, the conversation assistance audio engine 210 can switch between distinct audio modes in response to detecting a change in an acoustic signature of ambient sound detected at the conversation assistance audio device. In particular examples, the conversation assistance audio engine 210 can switch between audio modes when a sound pressure level of ambient noise passes a threshold level (either up or down), when a sensor such as a microphone detects that the user 225 is raising his/her voice about an established average decibel range, and/or a sensor (e.g., microphone) detects an acoustic signature such as the low frequency sound of an airplane cabin during flight.

In some implementations, the conversation assistance audio engine 210 can provide a suggested audio mode for the personal audio device 10 to the user 225 based upon the feedback from the user 225 and the known audio characteristics of the simulated audio environment(s) and the personal audio device 10, prior to adjusting the setting(s) 270 on the personal audio device 10. In this example, the conversation assistance audio engine 210 can present the user 225 with a suggested audio mode setting prior to making any adjustment to the setting(s) 270. With reference to the flow diagram in FIG. 3, this optional process is shown as process 425, which can be performed between process 420 and process 430, providing the user 225 with a potential audio mode for use of the personal audio device 10 after processing that user's feedback. The conversation assistance audio engine 210 can notify the user 225 about the suggested audio mode via any mechanism described herein, e.g., via an interface prompt such as a notification on the smart device 280 or the personal audio device 10 ("consider Quiet Conversation setting") and/or a voice prompt via the transducers 28 on the personal audio device 10.

As noted herein, the conversation assistance audio engine 210 can be configured to adjust at least one of the audio settings 270 based upon user feedback about the simulated audio environment(s) and known characteristics of the environment(s) and the personal audio device 10. In some cases, the audio settings 270 can be adjusted by applying a signal processing modification in the personal audio device 10 or a computing device (e.g., smart device 280) connected with the personal audio device 10. The signal processing modifications can include any adjustments described herein, e.g., wide dynamic range compression parameters, directivity, etc. In certain cases, the signal processing modification is performed as a weighted adjustment, such that a first adjustment of one parameter does not have a significant impact on the audio settings 270 (e.g., where the adjustment was made in error). In these cases, subsequent similar adjustments can have a greater impact on the audio settings 270. Weighted adjustment can be used to limit unintended impacts on the audio settings 270, and can be performed using techniques such as N-point running-average, median filtering, etc.

FIG. 7 shows a flow diagram illustrating an additional approach for personalizing a conversation assistance audio device (e.g., personal audio device 10) according to various implementations. The processes illustrated can be performed by the conversation assistance audio engine 210, and as such, FIG. 7 is referred to concurrently with FIGS. 1 and 2, with particular focus on FIG. 2.

In certain case, this process can include receiving a command from the user 225 for assistance with audio settings 270 in personal audio device 10 (process 710, FIG. 7). In various particular implementations, the user command is a single interface command, such as a single tactile command (e.g., detectable by sensor system 36), a single gesture command (e.g., detectable by sensor system 36), or a single voice command (e.g., detectable by microphones in personal audio device 10 and/or smart device 280). According to some implementations, the user 225 can easily initiate this personalization process by using a single interface command, that is, a command that initiates a subsequent personalization process without the need for an intervening command.

In response to receiving the single interface command from the user 225, the conversation assistance audio engine 210 (including feedback logic 310, settings lookup/adjustment logic 320 and sensor data processing logic 330) can apply a baseline set of audio settings to the personal audio device 10 (process 720, FIG. 7). In certain cases the baseline set of audio settings are median audio settings for a respective plurality of audio parameters (e.g., volume, tone, balance) or user-defined audio settings for the respective plurality of audio parameters from a group of users. Some instances may rely upon a baseline, or median, group of audio settings for the personal audio device 10 constructed from user profiles 290. This baseline can be built from an average of a population of users, such as all users of the personal audio device 10, or from a selected subset in that population (e.g., users that have used the device for a certain period, are of a certain age, or are of a certain gender). In other cases, the personal audio device 10 is configured to revert to default audio settings in response to receiving single interface command via the conversation assistance audio engine 210.

As noted herein, the baseline audio settings on the personal audio device 10 can be applied in response to the single interface command without any intervening command or communication between the user 225 and the personal audio device 10. In some examples, the user 225 taps an interface button on the personal audio device 10, gestures using his/her body (detected by sensor system 36), or makes a simple voice command (e.g., "Help"), and the conversation assistance audio engine 210 applies the baseline settings to the personal audio device 10 (without an intervening prompt or command from user 225).

In certain cases, when the baseline audio settings are applied to the personal audio device 10, the user 225 may wish to change those settings. In these cases, the conversation assistance audio engine 210 can receive a user command to change the baseline audio settings (process 730, FIG. 7), e.g., via any interface described herein. As described with respect to process 710, the user command can be a single interface command, such as a single tactile command, a single gesture command, or a single voice command.

In response to receiving that user command, the conversation assistance audio engine 210 can apply a modified set of audio settings to the personal audio device 10 (process 740, FIG. 7). These modified audio settings can be applied based upon usage of the personal audio device 10 (e.g., from the user's profile 290 stored in profile system 300) and a population model of usage of similar personal audio devices 10 (e.g., constructed from user profiles 290 stored in profile system 300). In certain implementations, the conversation assistance audio engine 210 presents the user 225 with the most common (e.g., the N-most common) adjustments made after users view the same or different simulated audio environment(s). In particular cases, the conversation assistance audio engine 210 presents the user 225 with these N-most common adjustments sequentially. In other cases, the conversation assistance audio engine 210 can apply a settings modification rule such as: increase or decrease a wide dynamic range compression parameter (or, "World Volume") by a noticeable step size (e.g., 5 decibels).

According to various implementations, the conversation assistance audio engine 210 can be configured to iteratively adjust the audio settings 270 on the personal audio device 10 in response to receiving user commands, e.g., single interface commands. For example, as shown in FIG. 7 (in loop 750), the conversation assistance audio engine 210 can be configured to iteratively receive a subsequent user command to change the modified set of audio settings (looping back to process 730), and apply a further modified set of audio settings to the personal audio device 10 in response to receiving that subsequent user command (process 740). As with the initial modification of audio settings, the subsequent modification(s) can be applied based upon usage of the conversation assistance audio device by the user 225, as well as the population model of usage of similar conversation assistance audio devices.

The conversation assistance audio engine 210 is described in some examples as including logic for performing one or more functions. In various implementations, the logic in conversation assistance audio engine 210 can be continually updated based upon data received from the user 225 (e.g., user selections or commands), sensor data received from the sensor system 36, settings updates (in settings library 260), updates and/or additions to the audio library 240 and/or updates to user profile(s) 290 in the profile system 300.

In some example implementations, conversation assistance audio engine 210 (e.g., using feedback logic 310, settings lookup/adjustment logic 320 and/or sensor data processing logic 330) is configured to perform one or more of the following logic processes using sensor data, command data and/or other data accessible via profile system 300, smart device 280, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, conversation assistance audio engine 210 is configured to work in concert with sensor system 36 to continually monitor changes in one or more environmental conditions. In some cases, sensor system 36 may be set in an active mode, such as where a position tracking system pings nearby Wi-Fi networks to triangulate location of the personal audio device 10, or a microphone (e.g., microphones 18 and/or 24) remains in a "listen" mode for particular ambient sounds. In other implementations, sensor system 36 and conversation assistance audio engine 210 can be configured in a passive mode, such as where a wireless transceiver detects signals transmitted from nearby transceiver devices or network devices. In still other implementations, distinct sensors in the sensor system 36 can be set in distinct modes for detecting changes in environmental conditions and transmitting updated sensor data to conversation assistance audio engine 210. For example, some sensors in sensor system 36 can remain in an active mode while audio device 10 is active (e.g., powered on), while other sensors may remain in a passive mode for triggering by an event.

As described herein, user prompts can include an audio prompt provided at the audio device 10, and/or a visual prompt or tactile/haptic prompt provided at the audio device 10 or a distinct device (e.g., smart device 280). In some cases, an audio prompt can include a phrase such as, "Would you like to personalize your conversation assistance device?," or "Respond with a nod or 'yes' to adjust audio settings," or, "Take action X to initiate personalization mode." These are merely examples of audio prompts, and any suitable audio prompt could be used to elicit actuation by the user 225. In other cases, a visual prompt can be provided, e.g., on a smart device 280 or at the audio device 10 (e.g., at a user interface) which indicates that one or more operating modes or modifications are available. The visual prompt could include an actuatable button, a text message, a symbol, highlighting/lowlighting, or any other visual indicator capable of display on the audio device 10 and/or the smart device 280. A tactile/haptic prompt can include, e.g., a vibration or change in texture or surface roughness, and can be presented at the audio device 10 and/or smart device 280. This tactile/haptic prompt could be specific to the conversation assistance audio engine 210, such that the tactile/haptic prompt is a signature which indicates the operating mode (e.g., personalization mode) or adjustment (e.g., single-command adjustment) is available. As the tactile/haptic prompt may provide less information about the underlying content offered, distinct tactile/haptic prompts could be used to reflect priority, e.g., based upon user profile(s) 290 or other settings.

In some particular implementations, actuation of the prompt can be detectable by the audio device 10, and can include a gesture, tactile actuation and/or voice actuation by user 225. For example, user 225 can initiate a head nod or shake to indicate a "yes" or "no" response to a prompt, which is detected using a head tracker in the sensor system 36. In additional implementations, the user 225 can tap a specific surface (e.g., a capacitive touch interface) on the audio device 10 to actuate the prompt, or can tap or otherwise contact any surface of the audio device 10 to initiate a tactile actuation (e.g., via detectable vibration or movement at sensor system 36). In still other implementations, user 225 can speak into a microphone at audio device 10 to actuate the prompt and initiate the personalization functions described herein.

In some other implementations, actuation of the prompt is detectable by the smart device 280, such as by a touch screen, vibrations sensor, microphone or other sensor on the smart device 280. In certain cases, the prompt can be actuated on the audio device 10 and/or the smart device 280, regardless of the source of the prompt. In other implementations, the prompt is only actuatable on the device from which it is presented. Actuation on the smart device 280 can be performed in a similar manner as described with respect to audio device 10, or can be performed in a manner specific to the smart device 280.

The personalization processes described according to various implementations can significantly improve the user experience when compared with conventional approaches, for example, by closely tailoring the audio settings on the personal audio device 10 to user preferences. The personalization processes described according to various implementations can ease user setup of the personal audio device 10 and improve conversation assistance functions during use. Additionally, certain implementations allow the user to change audio settings with a single interface command, streamlining the process of adjusting settings. Because the conversation assistance audio device (personal audio device 10) is often used in a public setting, users can appreciate the discreet nature of single interface command-based adjustments to the audio settings.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of personalizing a conversation assistance audio device, the method comprising:
    while the conversation assistance audio device is powered on, receiving a command from a user for assistance with audio settings in the conversation assistance audio device,
    wherein the user command received while the conversation assistance audio device is powered on comprises a single interface command;
    applying a baseline set of audio settings to the conversation assistance audio device in response to receiving the user command for assistance;
    receiving a user command to change the baseline set of audio settings;
    applying a modified set of audio settings to the conversation assistance audio device in response to receiving the user command to change the baseline set of audio settings, wherein the modified set of audio settings are applied based upon usage of the conversation assistance audio device and a population model of usage of similar conversation assistance audio devices, and
    iteratively performing the following:
    receiving a subsequent user command to change the modified set of audio settings; and applying a further modified set of audio settings to the conversation assistance audio device in response to receiving the subsequent user command,
    wherein the further modified set of audio settings are applied based upon the usage of the conversation assistance audio device and the population model of usage of similar conversation assistance audio device, and wherein the subsequent user command comprises a single interface command.

2. The computer-implemented method of claim 1, wherein the single interface command comprises a single voice command, a single tactile command, or a single gesture command.

3. The computer-implemented method of claim 1, wherein the baseline audio settings are applied in response to the single interface command without any intervening command.

4. The computer-implemented method of claim 1, wherein:
    a) the baseline set of audio settings comprise median audio settings for a respective plurality of audio parameters, or
    b) the baseline set of audio settings comprise user-defined audio settings for the respective plurality of audio parameters from a group of users.

5. The computer-implemented method of claim 1, wherein the audio settings on the conversation assistance audio device comprise a directivity of a microphone array in the conversation assistance audio device.

6. The computer-implemented method of claim 1, wherein the audio settings on the conversation assistance audio device comprise at least one of:
    a microphone array filter configuration on the microphone array in the conversation assistance audio device,
    a volume of audio provided to the user at the conversation assistance audio device, or
    parameters controlling wide dynamic range compression or gain parameters controlling the shape of the frequency versus gain function.

7. The computer-implemented method of claim 1, wherein the modified set of audio settings and the further modified set of audio settings are applied sequentially based upon N-most common adjustments made to the set of audio settings by other users in the population model.

8. The computer-implemented method of claim 1, wherein the user command and the subsequent user command consist of only the single interface command.

9. The computer-implemented method of claim 8, wherein the single interface command provides a discrete adjustment command for the user in a public use setting.

10. The computer-implemented method of claim 1, wherein the modified set of audio settings are applied based upon N-most common adjustments made to the set of audio settings by other users in the population model,
wherein the N-most common adjustments are identified by presenting the other users with a set of simulated audio environments played back at the conversation assistance audio device.

11. The computer-implemented method of claim 1, wherein the modified set of audio settings are determined based on a settings modification rule and are applied to provide an audibly noticeable adjustment to audio output at the conversation assistance audio device, wherein the settings modification rule defines an increase in a wide dynamic range compression parameter or an increase in the wide dynamic range compression parameter by greater than a threshold, wherein the threshold is based on an audibly noticeable step size, and wherein the threshold is equal to approximately five (5) decibels.

12. A computer-implemented method of personalizing a conversation assistance audio device, the method comprising:
receiving a command from a user for assistance with audio settings in the conversation assistance audio device;
applying a baseline set of audio settings to the conversation assistance audio device in response to receiving the user command for assistance;
receiving a user command to change the baseline set of audio settings;
applying a modified set of audio settings to the conversation assistance audio device in response to receiving the user command to change the baseline set of audio settings,
wherein the modified set of audio settings are applied based upon usage of the conversation assistance audio device and a population model of usage of similar conversation assistance audio devices,
wherein the modified set of audio settings are determined based on a settings modification rule and are applied to provide an audibly noticeable adjustment to audio output at the conversation assistance audio device; and
iteratively performing the following:
receiving a subsequent user command to change the modified set of audio settings; and
applying a further modified set of audio settings to the conversation assistance audio device in response to receiving the subsequent user command,
wherein the further modified set of audio settings are applied based upon the usage of the conversation assistance audio device and the population model of usage of similar conversation assistance audio device, and wherein the user command and the subsequent user command consist of a single user interface command.

13. The computer-implemented method of claim 12, wherein the single interface command provides a discrete adjustment command for the user in a public use setting, wherein the settings modification rule defines an increase in a wide dynamic range compression parameter or an increase in the wide dynamic range compression parameter by greater than a threshold, and wherein the threshold is based on an audibly noticeable step size.

* * * * *